(12) United States Patent
Augimeri

(10) Patent No.: US 12,313,108 B2
(45) Date of Patent: May 27, 2025

(54) MULTIPURPOSE SCREW

(71) Applicant: B.M.B. Investments Pty Ltd, Sydney (AU)

(72) Inventor: Matthew Augimeri, Sydney (AU)

(73) Assignee: B.M.B. Investments Pty Ltd (AU)

( * ) Notice: Subject to any disclaimer, the term of this patent is extended or adjusted under 35 U.S.C. 154(b) by 216 days.

(21) Appl. No.: 17/796,978

(22) PCT Filed: Feb. 11, 2021

(86) PCT No.: PCT/AU2021/050119
§ 371 (c)(1),
(2) Date: Aug. 2, 2022

(87) PCT Pub. No.: WO2021/159181
PCT Pub. Date: Aug. 19, 2021

(65) Prior Publication Data
US 2023/0067592 A1    Mar. 2, 2023

(30) Foreign Application Priority Data
Feb. 11, 2020   (AU) ................ 2020900367

(51) Int. Cl.
*F16B 25/00*    (2006.01)
*F16B 25/10*    (2006.01)
*F16B 23/00*    (2006.01)

(52) U.S. Cl.
CPC ...... *F16B 25/0031* (2013.01); *F16B 25/0063* (2013.01); *F16B 25/0073* (2013.01); *F16B 25/103* (2013.01); *F16B 23/003* (2013.01); *F16B 25/0052* (2013.01); *F16B 25/0068* (2013.01)

(58) Field of Classification Search
CPC .............. F16B 25/0068; F16B 25/0057; F16B 25/0031; F16B 35/065
USPC .................................. 411/412, 399
See application file for complete search history.

(56) References Cited

U.S. PATENT DOCUMENTS

| 2,982,166 | A | * | 5/1961 | Hobbs | ................ | F16B 25/0015 |
| | | | | | | 411/959 |
| 5,190,426 | A | * | 3/1993 | Wieder | ............... | F16B 25/0068 |
| | | | | | | 411/386 |
| 6,394,725 | B1 | | 5/2002 | Dicke | | |

(Continued)

FOREIGN PATENT DOCUMENTS

| EP | 0181390 B1 | 5/1986 |
| EP | 2326848 B1 | 6/2011 |
| GB | 1442508 A | 7/1976 |

OTHER PUBLICATIONS

International Search Report and Written Opinion issued on Mar. 2, 2021 for PCT/AU2021/050119.

(Continued)

*Primary Examiner* — Flemming Saether
(74) *Attorney, Agent, or Firm* — Barnes & Thornburg LLP

(57) ABSTRACT

A multipurpose screw is provided. The screw comprises: a head having a tool engaging formation, a self-drilling drill tip, and a shank extending between the head and the drill tip. The shank includes a threaded portion and an unthreaded portion. The threaded portion includes a major thread extending from the drill tip. The ratio between the major diameter of the major thread and the pitch of the major thread is from 1.2 to 2.4.

16 Claims, 10 Drawing Sheets

(56) References Cited

U.S. PATENT DOCUMENTS

| | | | |
|---|---|---|---|
| 6,926,484 B2* | 8/2005 | Kram | F16B 25/10 |
| | | | 411/311 |
| 7,160,073 B2* | 1/2007 | Mizuno | F16B 25/0047 |
| | | | 411/417 |
| 8,864,431 B2* | 10/2014 | Su | F16B 25/0063 |
| | | | 411/387.1 |
| 9,145,911 B2* | 9/2015 | Shih | F16B 25/0057 |
| 9,482,258 B2* | 11/2016 | Park | F16B 25/0063 |
| 9,581,183 B2* | 2/2017 | Lajewardi | F16B 25/103 |
| 9,581,193 B2 | 2/2017 | Brzezinski et al. | |
| 9,797,429 B2* | 10/2017 | Hargis | F16B 25/0031 |
| 10,982,703 B2* | 4/2021 | Lajewardi | F16B 25/0026 |
| 11,204,055 B2* | 12/2021 | Lajewardi | F16B 25/103 |
| 11,598,362 B2* | 3/2023 | Deutscher | F16B 25/0084 |
| 2004/0096293 A1* | 5/2004 | Tadich | F16B 25/0031 |
| | | | 411/387.8 |
| 2004/0156696 A1* | 8/2004 | Grosch | B29C 66/721 |
| | | | 411/378 |
| 2007/0297871 A1 | 12/2007 | Lu et al. | |
| 2011/0164944 A1 | 7/2011 | Hughes | |
| 2013/0302111 A1* | 11/2013 | Shih | F16B 25/0026 |
| | | | 411/387.4 |
| 2018/0135682 A1 | 5/2018 | Gong et al. | |

OTHER PUBLICATIONS

Examination Report No. 1 issued on Feb. 8, 2022 for Australian Patent Application 2021290294.
Extended European Search Report for EP Application No. 21754166.3, dated Jan. 5, 2024.

* cited by examiner

MULTIPURPOSE SCREW

CROSS-REFERENCE TO RELATED APPLICATIONS

This application is a national phase application of International Patent Application PCT/AU2021/050119, filed Feb. 11, 2021, entitled A Multipurpose Screw, which claims priority to Australian Provisional Patent Application 2020900367, filed Feb. 11, 2020. The aforementioned applications are incorporated herein by reference.

FIELD

This disclosure relates to a multipurpose screw.

BACKGROUND

Different types of screws are conventionally designed to be used to fix together different materials. For example, different screws are designed for fixing timber, including hardwood and softwood, chipboard, laminated sheeting such as plywood, various metals including aluminum and mild steel, masonry, fiber cement sheets, particleboard, and polymers including acrylic and polycarbonate sheets. Depending on the job, the gauge and length of the screw will also vary, as well as the screw head.

As a result, a handyman, carpenter or builder needs to have a large number of different types of screws in stock for different jobs and materials, and has to go through a selection process to find the appropriate screw. This is neither time-nor cost-effective. When a suitable screw is not available, it is not unusual for a screw to be selected which is not suited to the particular job. As a result, the job may be compromised, with potential safety issues.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

According to an aspect of the invention there is provided a multipurpose screw comprising: a head having a tool engaging formation, a self-drilling drill tip, and a shank extending between the head and the drill tip, and including a threaded portion, the threaded portion including a major thread extending from the drill tip, wherein the ratio between the major diameter of the major thread and the pitch of the major thread is from 1.2 to 2.4.

The drill tip may be configured to drill through various types of metals, may include a tip end having a chamfer with an included angle of between 80 and 120 degrees, and may include opposed leading faces and associated thread flutes.

The threaded portion may include a secondary or low thread extending from the drill tip to define with the major thread a high/low thread which does not extend along the shank for as far as the major thread. The high/low thread may extend along the length of the shank in the range of 25% to 50% of the major thread.

The threaded portion may extend for at least 60% along the length of the shank relative to the unthreaded portion.

The major thread may be formed with a series of swarf indents defining at least one swarf channel, and the series of swarf indents may be coextensive with the high/low thread.

In some examples, at least the first three turns of the major thread may be formed with the series of swarf indents defining the at least one swarf channel, and the swarf indents may be equi-spaced from one another every 180°, 120° or 90° along the thread depending on the number of indents or channels, the indents being offset for each successive indent.

The head may be a truss head having an inner face with at least one frusto-conical or tapered portion, and the inner face may be provided with a plurality of equi-spaced radially extending ribs.

The multipurpose screw may include an upper thread adjacent the truss head, the upper thread including at least two turns.

The inner face of the truss head may comprise a two-stage taper, the two-stage taper typically including a first lower frusto-conical portion extending from the shank of the screw and a second upper frusto-conical portion extending from the lower frusto-conical portion towards an upper surface of the head, the included angle of the lower frusto-conical portion being greater than the included angle of the upper frusto-conical portion.

The included angle of the lower frusto-conical portion may be from 60° to 80°, 65° to 75°, 68° to 71°, or 69.5° and the corresponding included angle of the upper frusto-conical portion may be from 35° to 55°, 40° to 50°, or 42.5° to 46°, or 44.2°.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION

Figure 1A:
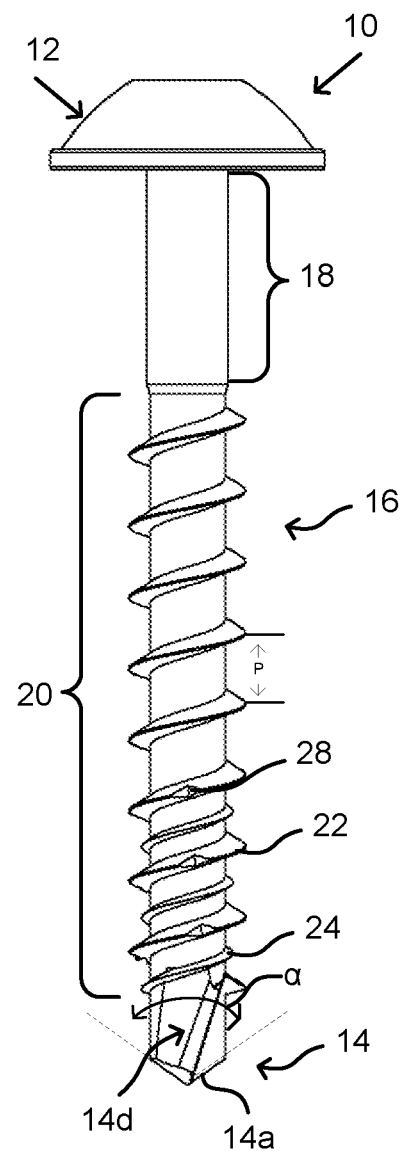
FIGS. 1a to 1e are respective first side, top, bottom, second side and perspective views of a first embodiment of a multipurpose screw.
Figure 1B:
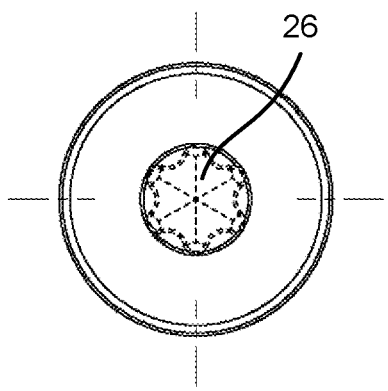

Referring first to FIGS. 1a to 1e, a dome or contour head screw 10 is shown having a dome head 12, a self-drilling drill tip portion 14 and a shank 16 extending between the head 12 and the drill tip 14, the shank including a non-threaded portion 18 and a threaded portion 20.

The threaded portion 20 includes a single start major thread 22 extending from the drill tip 14 and a single start secondary or low thread 24 also extending from the drill tip. Together, the major thread 22 and the secondary or low thread 24 define a high/low thread. As the number of turns in the secondary or low thread 24 is less than the number of turns in the major thread 22, the high/low thread does not extend along the shank for as far as the major thread 22. Without wishing to be bound by theory, it is considered that the presence of at least one full turn of such a high/low thread at the tip end of the shank 16 results in improved drilling speeds in comparison to a similar screw using only a corresponding single start major thread. In this example, in which the screw 10 is a 10 gauge 50 mm screw, the major thread 22 has a typical diameter of 5.2 mm and the secondary or low thread 24 has a typical diameter of 3.9 mm.

The dome head 12 includes a tool-engaging recess in the form of a Torx recess 26. It will be appreciated that various other types of tool engaging or drive recesses or formations may be provided, including a hex recess, a square recess, a Phillips recess, a spanner recess, a tri-wing recess, a clutch recess, a one-way recess, or combinations thereof such as a Phillips-slot combination or a square-slot combination. External drives may also be provided such as a hexagonal or Torx drive.

The major thread 22 may be provided with a series of swarf indents 28 defining swarf channels. These are equispaced from one another roughly every 180°, 120° or 90° along the thread depending on the number of indents or channels but are slightly offset for each successive indent. In the embodiment illustrated the indents only extend for the first three turns of the major thread 22, which corresponds to the length of the secondary or low thread 24 such that the series of swarf indents 28 is coextensive with the high/low thread. It will be appreciated that these may be provided along the entire length of the major thread 22 or only partially along its length, commencing from the beginning of the thread at the drill tip portion 14. It will be further appreciated that, in some embodiments, the secondary or low thread 24 also may be provided with such a series of swarf indents.

Figure 1C:
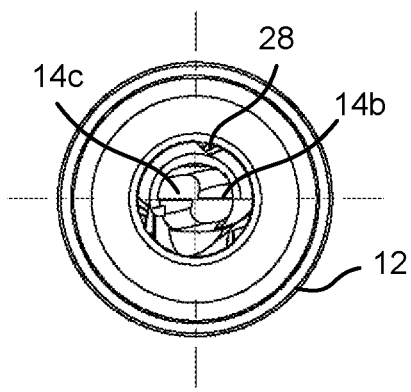
Figure 1D:
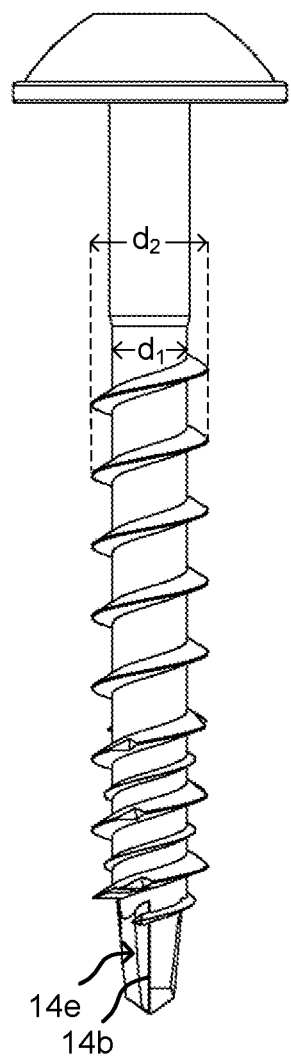
Figure 1E:
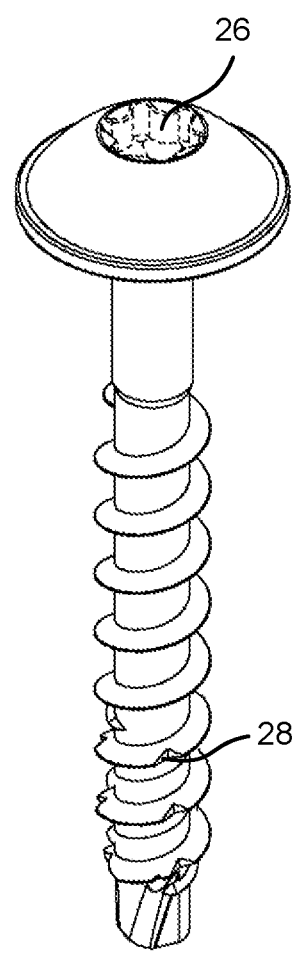
Figure 2A:
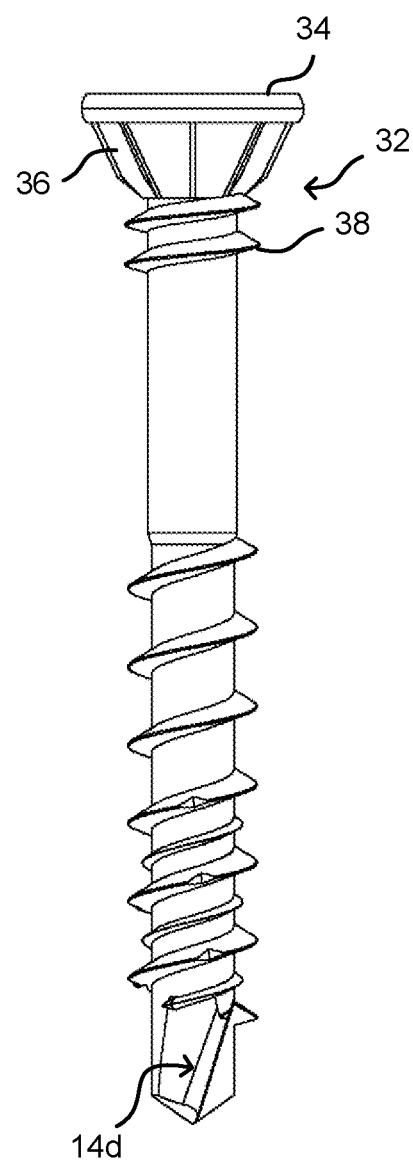
FIGS. 2a to 2e respective first side top, bottom, second side and perspective views of the second embodiment of multipurpose screw.
Figure 2B:
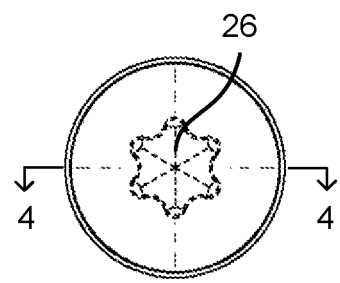
Figure 2C:
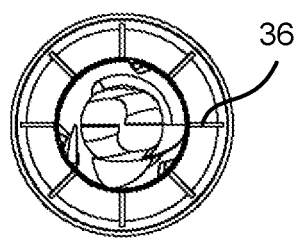
Figure 2D:
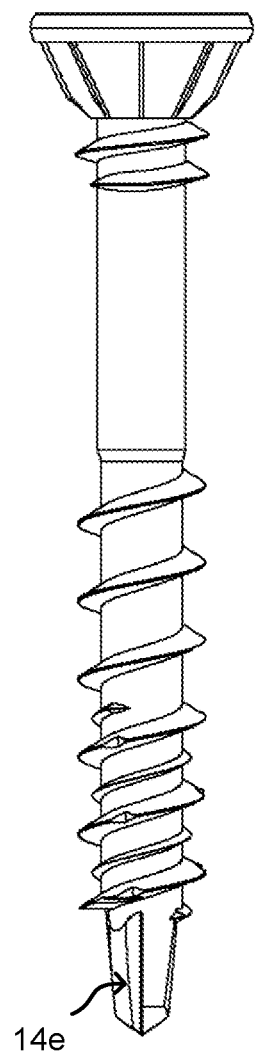
Figure 2E:
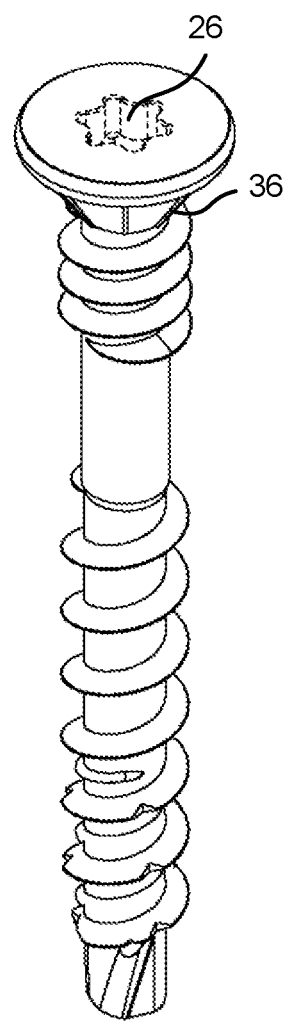

As illustrated in FIG. 1c, the indents of this embodiment have a substantially triangular profile when viewed in the axial direction of the screw 10. In the embodiment illustrated, the tip of this profile has an included angle of approximately 105 degrees, and the depth to which the tip is indented into the major thread 22 substantially corresponds to the difference between the height of the major thread 22 and the height of the secondary or low thread 24. It will be appreciated that, in other embodiments, the indents may be formed with different included angles, though an angle in the range of 90 to 120 degrees, or 100 to 120 degrees.

It will be further appreciated that, in other embodiment, indents of different depths may be utilized. For example, when the secondary or low thread 24 is also provided with a series of swarf indents, it may be advantageous for the indents in the major thread to have a depth that is greater than the difference between the height of the major thread 22 and the height of the secondary or low thread 24.

The drill tip portion 14 includes a tip end 14a having a chamfer with an included angle α of 100–110 degrees. It will be appreciated that this angle may vary from between 80 to 120 degrees. The tip end includes opposed leading faces 14b and 14c, and associated thread flutes 14d and 14e, with the tip portion typically being configured to drill through various types of metals, including aluminum and mild steel. The drill tip portion may also be configured to drill through other relatively hard materials such as hardwoods, fiber cement sheets, masonry, particleboard, plywood and polymers including acrylic and polycarbonate sheets to provide a pilot hole for the threads.

The screw 10 of FIG. 1 is a 10 gauge 50 mm screw with the single start secondary or low thread 24 having approximately three full turns and the major thread 22 having approximately eight full turns. Accordingly, the secondary or low thread 24 extends along the shank for approximately 37.5% of the length of the major thread 22. It will be appreciated that the number of turns of both the major and secondary or low threads may vary depending on the screw gauge and length, though the secondary or low thread 24 will generally extend along the shank for a percentage of the length of the major thread 22 in the range of 25% to 50%.

Without wishing to be bound by theory, it is considered that terminating the secondary or low thread 24 at a lower point on the shank 16 than the major thread 22, such that the high/low thread does not extend along the shank for as far as the major thread 22, may assist with and further promote the removal of swarf from above this termination point. One potentially advantageous result is that the swarf indents 28 can terminate at a corresponding point on the major thread 22, as is the case in the present 10 gauge 50 mm example screw 10, without significantly compromising swarf removal performance. Omitting the swarf indents 28 from the major thread 22 above the termination point may improve the pull out strength performance of the screw when compared to a similar screw in which the swarf indents 28 continue the full length of the major thread 22.

In the present 10 gauge 50 mm example screw 10, the major and secondary or low threads 22 and 24 have a pitch P of 3.63 mm, though this may vary from approximately 2.5 mm to 3.9 mm. The minor or root diameter d1 is approximately 3.6 mm and the major diameter d2 is approximately 5.2 mm. It will be appreciated that this is also subject to variations within the gauge parameters, from approximately 3.4 mm to 3.7 mm in the case of the root diameter, and 5.0 mm to 5.4 mm in the case of the major diameter. The combined threads extend at least 60% up the length of the shank.

The resultant major diameter to thread pitch ratio is in the range of 1.2-2.4, and the minor diameter to thread pitch ratio is in the range of 0.8 to 1.6. These ratios are substantially smaller than would be expected for a conventional self-drilling screw adapted for use in fixing metals, where threads are more closely spaced.

Referring now to FIGS. 2a to 2e, a second embodiment of a multipurpose screw 32 is shown which is similar to the screw 10 of FIGS. 1a to 1e, with the major difference being the provision of a truss head 34 which allows the screw to be countersunk. The tapered underside of the head is provided with eight equi-spaced ribs 36 which assist in the countersinking process. It will be appreciated that the number of ribs may vary, typically from four to eight or ten in the case of larger screw heads. A top thread 38 is also provided for anchoring the screw more firmly while being countersunk. In the illustrated embodiment the top thread 38 includes four full turns, though it will be appreciated that the number of turns of the top thread may vary depending on the length and gauge of the screw. Typically, fewer turns may also be provided, including two or three. The screw 32 is shown with a Torx socket 26, but as described previously this may vary, with the exception that external hex or Torx drives are not feasible in the case of a truss head as it is countersunk.

Figure 3:
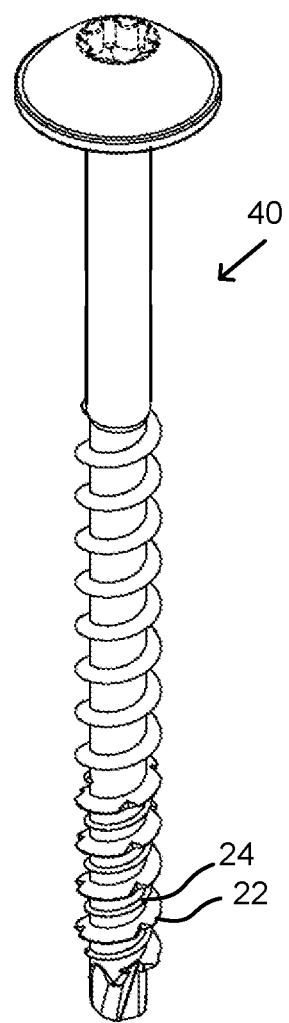
FIG. 3 is a perspective view of a third embodiment of a multipurpose screw.

FIG. 3 shows a further embodiment of a dome head screw 40 which is a 75 mm 12 gauge screw. The number of turns of the major thread 22 are increased to approximately 13, and the number of turns of the secondary or low thread 24 are increased to approximately four. The threaded portion occupies approximately 70% of the shank. It will be appreciated that the number of turns of the major and secondary or low thread may vary as per the previous embodiment.

Table 1 shows different gauge screws of with major diameter to pitch ratios. It will be appreciated that these may vary within the indicated overall ranges.

TABLE 1

| Gauge | | 8 | 10 | 12 | 14 |
|---|---|---|---|---|---|
| Screw Diameter (mm) | | 4.2 | 4.8 | 5.5 | 6.4 |
| Major Diameter (mm) | | 4.6 | 5.2 | 6 | 6.8 |
| Minor Diameter (mm) | | 3.0 | 3.6 | 4.1 | 4.6 |
| Ratio: Minor to Major Diameters | | 65.8% | 69.2% | 68.3% | 67.6% |
| Max. thread pitch (mm) | | 3.90 | 3.90 | 3.90 | 3.90 |
| Intermediate thread pitch 1 (mm) | | 3.63 | 3.63 | 3.63 | 3.63 |
| Intermediate thread pitch 2 (mm) | | 2.31 | 2.83 | 2.82 | — |
| Min. thread pitch (mm) | | 2.12 | 2.54 | 2.54 | 3.18 |
| Ratio: Major diameter to thread pitch | Max. thread pitch | 1.18 | 1.33 | 1.54 | 1.74 |
| | Inter. thread pitch 1 | 1.27 | 1.43 | 1.65 | 1.87 |
| | Inter. thread pitch 2 | 1.99 | 1.84 | 2.13 | — |
| | Min. thread pitch | 2.17 | 2.05 | 2.36 | 2.14 |
| | Overall range (Min~Max) | 1.2-2.2 | 1.3-2.1 | 1.5-2.4 | 1.7-2.2 |

In particular it will be noted that for an 8 gauge screw, the major diameter to thread pitch ratio of the major thread is in the overall range of 1.2 to 2.2. More particularly, with reference to the two intermediate thread pitches, the ratio may be 1.2 to 2.0. For a 10 gauge screw the major diameter to thread pitch ratio of the major thread may be in the overall range of 1.3 to 2.1. More particularly, with reference to the two intermediate thread pitches, the ratio may be 1.4 to 1.9. For a 12 gauge screw the major diameter to thread pitch ratio of the major thread may be in the overall range of 1.5 to 2.4, more particularly, with reference to the two intermediate thread pitches, 1.6 to 2.2. For a 14 gauge screw the ratio may be 1.7 to 2.2 or, with reference to the intermediate thread pitch, 1.8 to 2.1.

Figure 4:
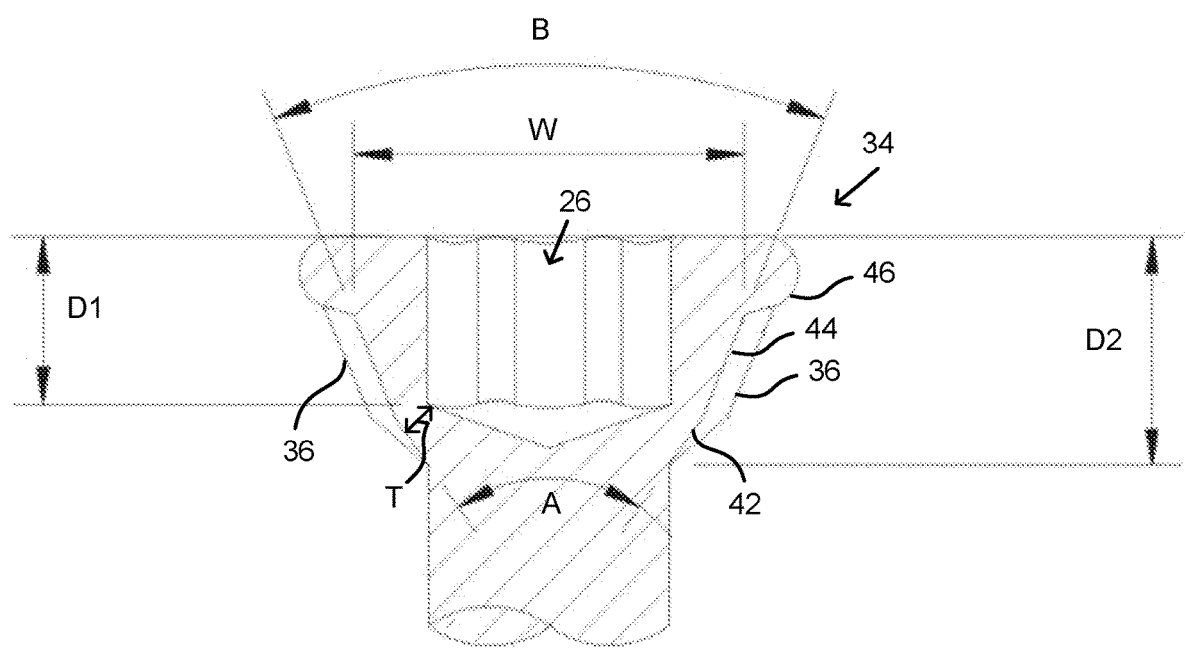
FIG. 4 is a cross-sectional detail of the head of the screw of FIGS. 2a to 2e along the lines 4-4 of FIG. 2b.

Referring now to FIG. 4, a cross-sectional detail of the head 34 of the truss screw 32 is shown with Torx socket 26 having a depth D1 of 2.6 to 2.8 mm, with the head 34 having a corresponding depth D2 of 3.7 mm for a 10 gauge screw having a shank diameter of 3.86 mm. The inner face of the head 34 includes a lower tapered or frusto-conical portion 42 which in this embodiment defines an included angle A of 69.5°, and an upper tapered or frusto-conical portion 44 defining an included angle β of 44.2°. The upper tapered portion 44 terminates in an upper overhanging lip portion 46, with the width W of the upper tapered portion 44 at its termination point being 6.3 mm.

It will be appreciated that the above-cited angles and measurements may vary, with the included angle of the lower tapered portion 42 varying from between 60-80°, 65° to 75°, 68° to 71°, or 69 to 70°, and the included angle of the upper tapered portion varying from between 35-50°, 40° to 50°, 42.5° to 46°, or 43° to 45°. The two-stage taper of the inner or lower face of the head enables a deeper recess 26 to be formed in the case of the head having less depth and width than would be required with a continuous taper, which allows for more efficient countersinking. In addition, the two-stage taper allows the structural integrity of the head to be preserved with the thickness T of the material between the socket and the inner face being at least 0.5 mm, preferably 0.6 mm.

The multipurpose screw may be suited to use with a number of different materials, including fiber cement, hardwood, softwood, laminated sheeting, masonry, medium density cement blocks, metals including aluminum and mild steel. Table 2 below sets out more details of potential materials.

TABLE 2

| | |
|---|---|
| Fibre Cement | Compressed Fibre Cement sheet |
| Fibre Cement | Non compressed Fibre Cement Sheet |
| HARDWOOD | Hardwood sleeper H4 |
| HARDWOOD | Merbau Decking |
| HARDWOOD | Merbau post - hardwood |
| LAMINATED SHEETING | Form plywood |
| LAMINATED SHEETING | Marine plywood |
| LAMINATED SHEETING | Plywood fastened to LVL * |
| MASONRY | Brick |
| MASONRY | Concrete |
| MEDIUM DENSITY CEMENT BLOCK | Besser block |
| METAL | Aluminium angle 3 mm with pine |
| METAL | Aluminium angle 3 mm with slipper |
| METAL | Metal plate 2.4 mm with pine |
| PARTICLE BOARD | Melamine into LVL * |
| POLY/ACRYLIC | Acrylic |
| POLY/ACRYLIC | Polycarb sheet |
| SOFT WOOD | PINE |

* LVL = Laminated veneer lumber

By relying on a combination of a suitable drill tip and thread pitch for a particular screw gauge the versatility of the multipurpose screw may be increased to deal with a number of different materials. This includes fixing together different materials such as aluminum and mild steel or other metal sheeting with softwood such as pine.

The multipurpose screw may be manufactured from low or medium carbon steels, and may include steels with or without additional alloying elements. The screw may also be provided with a number of different coatings, including a zinc nickel electroplated coating, and galvanized or polymer coatings.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A multipurpose screw comprising:
a head having a tool engaging formation;
a self-drilling drill tip, the drill tip including a tip end having a chamfer with an included angle of between 80 and 120 degrees, and the tip end including opposed leading faces and associated thread flutes;
a shank extending between the head and the drill tip, and including a threaded portion and an unthreaded portion, the threaded portion including a major thread extending from the drill tip, wherein the ratio between the major diameter of the major thread and the pitch of the major thread is from 1.2 to 2.4;
wherein the threaded portion includes a secondary, low thread extending from the drill tip to define with the major thread a high/low thread which does not extend along the shank for as far as the major thread;
wherein the major thread is formed with a series of swarf indents defining at least one swarf channel; and
wherein the thread flutes terminate at the threaded portion.

2. A multipurpose screw according to claim 1, wherein the drill tip is configured to drill through various types of metals.

3. A multipurpose screw according to claim 1, in which the high/low thread extends along the length of the shank in the range of 25% to 50% of the major thread.

4. A multipurpose screw according to claim 1, in which the series of swarf indents is coextensive with the high/low thread.

5. A multipurpose screw according to claim 1, wherein at least the first three turns of the major thread are formed with the series of swarf indents defining the at least one swarf channel.

6. A multipurpose screw according to claim 1, wherein the swarf indents are equi-spaced from one another every 180°, 120° or 90° along the thread depending on the number of indents or channels and each swarf indent is offset from an adjacent swarf indent.

7. A multipurpose screw according to claim 1, wherein the head is a truss head having an inner face with at least one frusto-conical or tapered portion.

8. A multipurpose screw according to claim 7, wherein the inner face is provided with a plurality of equi-spaced radially extending ribs.

9. A multipurpose screw according to claim 7, which includes an upper thread adjacent the truss head, the upper thread including at least two turns.

10. A multipurpose screw according to claim 7, wherein the inner face comprises a two-stage taper.

11. A multipurpose screw according to claim 10, wherein the two-stage taper includes a first lower frusto-conical portion extending from the shank of the screw and a second upper frusto-conical portion extending from the lower frusto-conical portion towards an upper surface of the head, an included angle of the lower frusto-conical portion being greater than an included angle of the upper frusto-conical portion.

12. A multipurpose screw according to claim 11, wherein the included angle of the lower frusto-conical portion is from 60° to 80°, and the corresponding included angle of the upper frusto-conical portion is from 35° to 55°.

13. A multipurpose screw according to claim 1, wherein the screw is an 8 gauge screw and the ratio between the major diameter of the major thread and the pitch of the major thread is from 1.2-2.2.

14. A multipurpose screw according to claim 1, wherein the screw is a 10 gauge screw and the ratio between the major diameter of the major thread and the pitch of the major thread is from 1.4-2.1.

15. A multipurpose screw according to claim 1, wherein the screw is a 12 gauge screw and the ratio between the major diameter of the major thread and the pitch of the major thread is from 1.6-2.4.

16. A multipurpose screw according to claim 1, wherein the screw is a 14 gauge screw and the ratio between the major diameter of the major thread and the pitch of the major thread is from 1.8-2.2.

* * * * *